Nov. 12, 1957  R. J. BUSH  2,812,983
SAFETY INTERLOCK APPARATUS FOR ANTI-WHEEL-SLIDE EQUIPMENT
Filed July 21, 1953
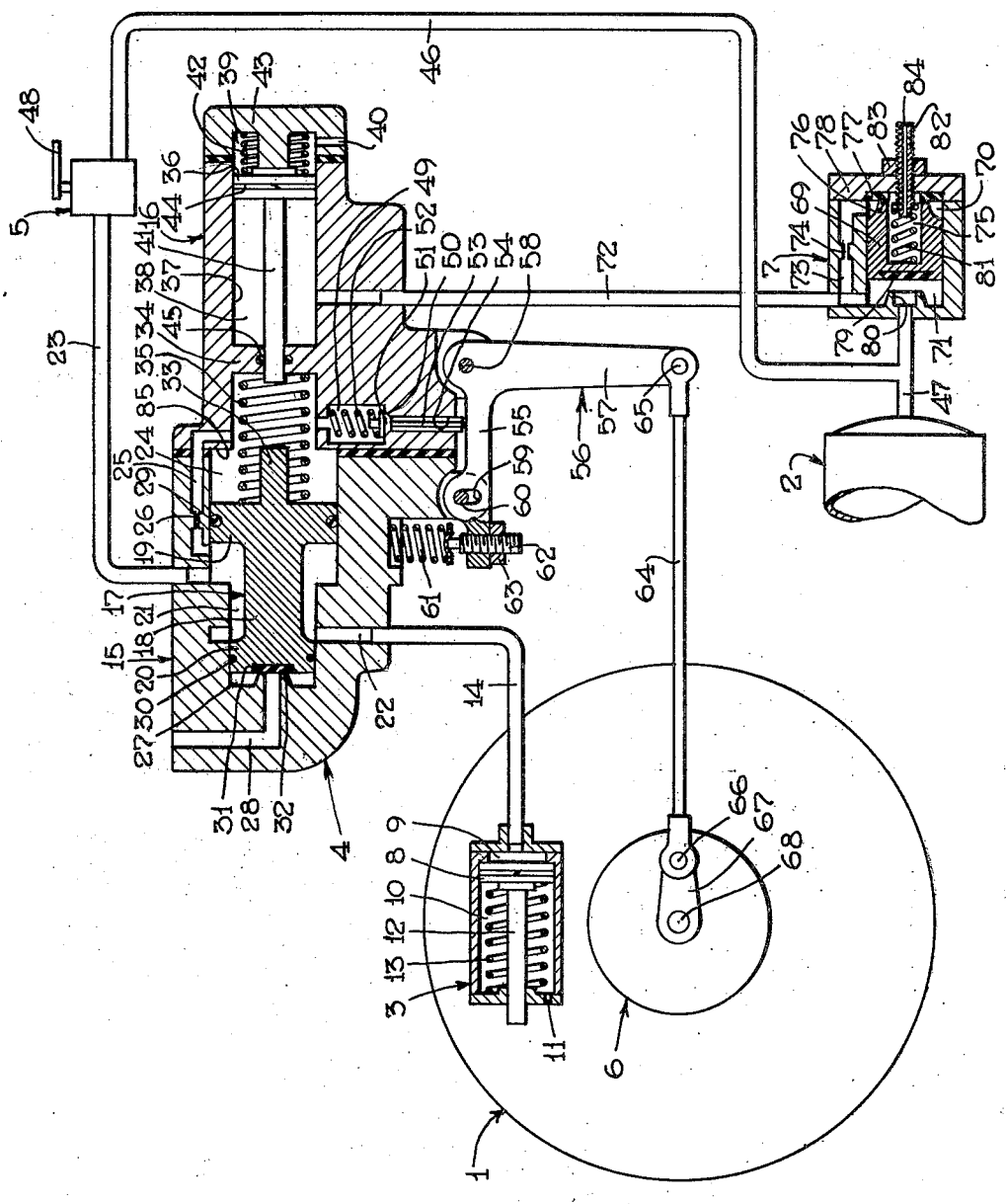
INVENTOR.
Rankin J. Bush
BY
Adelbert A. Steinmiller
ATTORNEY United States Patent Office 2,812,983
Patented Nov. 12, 1957

2,812,983

SAFETY INTERLOCK APPARATUS FOR ANTI-WHEEL-SLIDE EQUIPMENT

Rankin J. Bush, Greensburg, Pa., assignor to Westinghouse Air Brake Company, Wilmerding, Pa., a corporation of Pennsylvania Application July 21, 1953, Serial No. 369,465

7 Claims. (Cl. 303—21)

This invention relates to vehicle fluid pressure operable brake control apparatus of the type adapted to automatically prevent locking and sliding of a vehicle wheel, and, more particularly, to such a brake control apparatus embodying a safety interlock arrangement for preventing depletion of fluid pressure in the main reservoir below a point at which the fluid pressure would be ineffective to safely operate the wheel brakes.

In fluid pressure operable brake control apparatus of the type employed on airplanes, anti-wheel-slide control devices responsive to a slipping condition of a wheel have been provided for automatically releasing the fluid pressure from and reapplying the fluid pressure to the brake application devices associated with the wheels to correspondingly release and reapply the braking force on the wheels in repeated cycles during the stopping distance of the airplane and thereby prevent locking of the wheel. As herein used, the term "slipping condition" refers to the condition existing during the short interval, of the order of one or two seconds, in which the wheel decelerates at an excessively rapid rate toward a locked condition as a result of application of a braking force exceeding the permissible limit of adhesion of the wheel tread to the ground or road surface. As distinguished from the term slipping condition, the term "sliding condition," as used herein, refers to the dragging of a wheel in a locked condition on the runway or ground.

Tests heretofore conducted have demonstrated that as many as ten cycles of release and reapplication of the brakes may occur during the stopping distance of the airplane. If ground or runway conditions are wet or icy, the number of cycles of release and reapplication may be even greater.

It is possible that with such a high number of cycles of release and reapplication of the brakes, the fluid under pressure thereby drained from the fluid pressure reservoir may be so great that the compressor supplying fluid pressure to the main reservoir cannot maintain adequate pressure therein to provide an adequate degree of braking effort when the brakes are reapplied following the termination of the successive cycles of release and reapplication.

It is accordingly the principal object of my invention to provide a vehicle brake control system of the type described characterized by means for cutting out of operation the slip-responsive control device when the reservoir pressure reduces to a predetermined degree to thereby prevent further automatic release of the braking pressure and the consequent further reduction of reservoir pressure.

Other and more detailed objects of my invention will appear in the following more detailed description thereof when read in conjunction with the accompanying drawing.

In the accompanying drawing, the single figure is a diagrammatic view, partly in section and partly in outline, of a brake control apparatus embodying the invention.

*Description*

As shown in the drawing, the reference numeral 1 designates a wheel adapted to be braked. The wheel may be that of an airplane or any other vehicle employing fluid pressure operable brake apparatus for braking said wheel. The invention will hereinafter be described in connection with airplanes, but it is to be understood that it is not so limited, for it is equally applicable to brake systems of other wheeled vehicles.

The fluid pressure operable brake control apparatus comprises a reservoir 2, which is adapted to be charged by a compressor (not shown), with fluid at a pressure sufficient to effectively and safely operate the brake apparatus, a brake application device 3, a brake cylinder release valve device 4, a manually operable brake control valve device 5, a wheel-slip responsive control device 6, and a cutout valve device 7 which, according to the invention, is interlocked with said reservoir and said release valve device.

The wheel brake application device 3 is adapted to be arranged in conventional manner for applying braking force to the wheel 1 and, for the purpose of illustration, comprises a casing containing a piston 8 at one side of which there is a pressure chamber 9 adapted to be connected through a conduit comprising pipes 14, 23, 46 and 47 to the reservoir 2 and at the opposite side of which is a non-pressure chamber 10 vented to atmosphere through a port 11 in said casing. The piston 8 has a piston rod 12 extending through chamber 10 and the cylinder head to the exterior of the casing and adapted for actuating brake shoes or brake elements (not shown) to exert a braking effect on wheel 1 by suitable means (not shown). The piston 8 and the piston rod 12 are adapted to be moved in the direction of the left hand, as viewed in the drawing, by fluid pressure in chamber 9 to a brake-applying position in which a braking force on wheel 1 is effected. Upon relief of fluid pressure in chamber 9, a spring 13 provided in chamber 10 acts on piston 8 to move said piston and the piston rod 12 back to a normal position, in which they are shown in the drawing, and in which the braking force on wheel 1 is released.

The release valve device 4 is interposed between pipes 14 and 23 for controlling communication therebetween and thereby between the brake application device 3 and the reservoir 2, said release valve device comprising a casing containing at one end a piston valve device 15 and at the opposite end a valve locking device 16 for locking said piston valve device in a certain position, for purposes and in a manner hereinafter described.

The piston valve device 15 comprises a spool-shaped valve member 17 provided with a connecting member 18 having formed integrally therewith at one end a piston 19 and at the opposite end a disc type valve 20. The connecting member 18 is contained in a chamber 21 which is normally open by way of a passageway 22 in the casing and the pipe 14 to chamber 9 of the brake application device 3. At the opposite side of piston 19 is a pressure chamber 24 connected to chamber 21 through a passageway 25 provided with a choke 26, while at the opposite side of valve 20 is a chamber 27 which may be vented to atmosphere through a passageway 28. The chamber 24 has formed therein a shoulder 85 for a purpose which will later be described. Piston 19 and valve 20 are provided with sealing O-rings 29, 30, respectively, to prevent leakage of fluid under pressure past said piston and said valve. Valve 20 is also provided on the face thereof adjacent chamber 27 with an annular sealing gasket 31 adapted for seating on an annular seat rib 32 surrounding the opening of passageway 28 into said chamber. Piston 19 is further provided with an extending portion 33 of smaller diameter than said piston and projecting coaxially from the side of said piston adjacent chamber 24 toward a separating wall 34 at the opposite end of said chamber. Contained in chamber 24 and encircling the extending portion 33 is a spring 35 having one end bearing against piston 19 and the other end bearing against separating wall 34 and adapted for urging valve member 17 toward a normal position, in which it is shown in the drawing.

The valve locking device 16 comprises a piston 36 slidably operable in a bore 37 and axially aligned with valve member 17. Piston 36 cooperates with bore 37 to define at one side a pressure chamber 38 adjacent separating wall 34 and at the opposite side a non-pressure chamber 39 open to atmosphere by a port 40. A piston rod 41 associated with piston 36 extends coaxially from one face of said piston through chamber 38 and separating wall 34 into chamber 24, the end of said piston rod extending into chamber 24 being adapted to engage extending portion 33 of valve member 17 when said piston and said piston rod are moved out of a normal inoperative position, in which they are shown in the drawing, to a locking position in which said valve member 17 is retained in its normal position, and in which gasket 31 of valve 20 is seated on seat rib 32. A spring 42 contained in chamber 39 having one end bearing against piston 36 and the other end against an end wall 43 of the casing, is adapted for urging said piston and piston rod 41 toward their locking position. Piston 36 is provided with suitable sealing means, such as a piston ring 44, to prevent leakage of fluid under pressure from chamber 38 past said piston, while a sealing O-ring 45 mounted in separating wall 34 has sealing and sliding contact with piston rod 41. Chamber 21 of the piston valve device 15 is connected through conduit means comprising pipes 23, 46 and 47 to the main reservoir 2.

The control valve device 5, which is interposed between pipes 23 and 46, is the usual type self-lapping control valve device adapted to be manually operated by an operating handle 48 from a closed position through a plurality of open positions for controlling flow of fluid under pressure through said pipes.

The casing of the release valve device 4 contains a recess 49 opening into chamber 24 and having at its base an annular valve seat 50 on which a valve 51 is adapted to be normally seated. A spring 52 disposed in recess 49 is adapted for urging valve 51 toward its seated position, said valve having associated therewith a fluted valve stem 53 slidably operable in a bore 54 in the casing opening to the external surface of said casing to permit release of fluid pressure from chamber 24 past said valve stem when said valve is in an unseated position. Valve stem 53 projects to the exterior of the casing and is arranged to make abutting contact intermediate the ends of an arm 55 of an operating bell-crank lever 56. Another arm 57 of operating lever 56 is formed integrally at right angles with arm 55, said lever being pivotally mounted at the junction of said arms by means of a pin 58 secured in the casing of the release valve device 4. The arm 55 is provided at the end opposite its junction with arm 57 with a slot 59 into which extends a pin 60 secured in the casing of release valve device 4 to limit the pivotal motion of lever 56 about the pin 58. A spring 61 compressed between the casing of release valve device 4 and the end of arm 55 adjacent the slot 59 is adapted for biasing lever 56 toward a normal position, in which it is shown in the drawing and in which arm 55 disengages valve stem 53. A screw 62 is adjustably mounted at the end of arm 55 adjacent slot 59 for adjusting the compression of spring 61 and secured in an adjusted position by a lock nut 63.

Arm 57 is pivotally connected at the end opposite its junction with arm 55 to one end of a link rod 64 by means of a pin 65, the other end of said link rod being pivotally connected by means of a pin 66 to one end of a rocker arm 67. The other end of rocker arm 67 is rigidly connected to an operating shaft 68 of the control device 6.

The control device 6, which is shown in outline in the drawing, may be of any suitable type, but preferably is a rotary type, such as that disclosed, for example, in U. S. Patent No. 2,573,387, issued to me on October 30, 1951, including a housing adapted to be coaxially and removably attached to the wheel 1 for rotation therewith. While not shown in the drawing and not deemed essential to an understanding of the invention, the housing of the control device 6 contains a relatively rotatable rotary inertia mass connected through clutch means and a cluster of planetary gears to the operating shaft 68, so that, when rotation of said inertia mass is in synchronization with the rotation of the landing wheel 1, or what may be called a normal rotating position occupied when said wheel is not slipping on the runway, no relative effect is produced on said operating shaft, and the operating lever 56 of the release valve device 4 will remain in its normal position, but when said wheel is accelerating to ground speed immediately following touchdown or when said wheel is decelerating in response to a slip on the runway, said inertia mass will either lag behind or overrun, respectively, said wheel and operate said operating shaft to in turn operate the operating lever 56 of the release valve device 4 to a release position, which will be hereinafter described.

The cutout valve device 7 comprises a casing bored to slidably receive a cylindrical reciprocating valve member 69 which cooperates with said casing to define at one side of said valve member a chamber 70 and at the opposite side a chamber 71 normally open to pressure of fluid in reservoir 2 through pipe 47 and connected by a pipe 72 to chamber 38 of the locking device 16. Chamber 70 is connected to chamber 71 through a passageway 73 provided with a choke 74. Valve member 69 is provided at the side adjacent chamber 70 with a coaxial cylindrical recess 75 opening into said chamber, while the end of said valve member adjacent said chamber is externally chamfered so as to cooperate with said recess to form an annular seat rib 76 adapted to seat on an annular sealing gasket 77 mounted in an end wall 78 of the casing. The opposite end of valve member 69 has mounted therein an annular sealing gasket 79 adapted to make sealing engagement with an annular seat rib 80 surrounding the opening of chamber 71 leading to pipe 47 when said valve member is moved out of a normal position, in which it is shown in the drawing, to a cutoff position in which communication between said chamber and reservoir 2 through pipe 47 is closed. A spring 81 is disposed in recess 75 for urging valve member 69 toward its cutoff position, said spring having one end bearing against the base of said recess and the other end against a screw 82 adjustably mounted in end wall 78 for adjusting the compression of said spring. A lock nut 83 is provided for locking the screw 82 in an adjusted position. A vent 84 extending axially through the screw 82 permits venting of chamber 70 to atmosphere when valve member 69 is in its cutoff position.

While, for purposes of illustration, only one landing wheel assemblage is shown in the drawing, it should be understood that each landing wheel of an airplane or other vehicle is intended to be similarly provided with a brake control apparatus embodying the invention and to be controlled in the manner now to be described for the one landing wheel shown in the drawing.

In operation, let it be assumed that the fluid pressure in reservoir 2 is at a maximum operating value within a range sufficient to effectively and safely operate the brake apparatus, that the compression of spring 81 of the cutout valve device 7 has been adjusted to move valve member 69 to its cutoff position when the fluid pressure in said reservoir has been reduced, through use, to a minimum operating value within said range and below which it would not be deemed safe for automatic operation of the brake apparatus, that the several devices comprising the brake control apparatus are in their respective normal positions, in which they are shown in the drawing, and that chamber 71 of the cutout valve device 7 and chamber 38 of the valve locking device 16 are charged with fluid under pressure by way of pipe 47, chamber 71 and pipe 72, respectively. Let it also be assumed that the landing wheels of the airplane, in landing, have just made contact with the surface of the runway. The pilot of the airplane, at the time of touchdown of wheel 1 on the runway surface, or shortly thereafter, may operate the brake control valve device 5 to a desired brake application position, thereby opening communication between pipes 46 and 23 causing fluid under pressure to be supplied to chamber 21 of the piston valve device 15 and hence to chamber 24, through passageway 25. The choke 26 in passageway 25 restricts flow of fluid under pressure through said passageway, thereby delaying build-up of fluid pressure in chamber 24 with respect to that in chamber 21. As a result, the fluid pressure differential thus active on piston 19 will be sufficient to overcome the opposing force of spring 35 and cause movement of valve member 17 toward a righthand position, as viewed in the drawing, or a brake release position, limited by engagement of piston 19 with the shoulder 85. In such position of the valve member 17, the valve 20 will have been moved past the opening of passageway 22 so as to cut off communication between chamber 21 and chamber 9 of the brake application device 3 through pipe 14 and venting said chamber 9 to atmosphere by way of pipe 14, passageway 22, chamber 27 and passageway 28.

Immediately upon touchdown the wheel 1 will start to accelerate and overrun the rotary inertia mass contained in the anti-wheel-slide control device 6 and angular movement of the operating shaft 68 and the rocker arm 67 out of normal position, as in a clockwise direction, as viewed in the drawing, is correspondingly effected. This movement of arm 67, acting through link rod 64, will rock lever 56 of the release valve device 4 about the pin 58 in a clockwise direction, as viewed in the drawing, against the opposing force of spring 61. Arm 55 of lever 56 will engage valve stem 53 to move said stem upwardly and unseat valve 51 thus permitting fluid pressure in chamber 24 of piston valve device 15 to vent to atmosphere through recess 49, past valve 51 and valve stem 53. Because of such venting of chamber 24 to atmosphere and because of the restriction offered by choke 26 in the passageway 25 connecting chamber 21 with chamber 24, the fluid pressure in said chamber 24 is rapidly reduced, thus positively causing the differential fluid pressure in chamber 21 to overcome the opposing force of spring 35 and to move valve member 17 to its brake release position, as above described.

When, after touchdown, the wheel 1 has become accelerated to substantially ground speed, the inertia mass in the control device 6 will obtain a corresponding speed and permit spring 61 to return lever 56 to its normal position out of contact with valve stem 53, thereby permitting valve 51 to reseat to prevent further venting of chamber 24 to atmosphere. Closing of chamber 24 to atmosphere will permit fluid pressure therein to equalize with that in chamber 21, and spring 35 thus biases valve member 17 to its normal position to disestablish communication between pipe 14 andl passageway 28 leading to atmosphere and to reestablish communication between chamber 21 and chamber 9 of the brake application device 3 through passageway 22 and pipe 14. With fluid pressure thus reestablished in chamber 9 of the brake application device 3, piston 8 is actuated, against the opposing force of spring 13, to cause a braking effect to be exerted on wheel 1.

Let it be assumed now that, with a braking effect being applied to wheel 1, said wheel runs into an uneven or slippery condition on the runway so that the degree of the brake application is such as to exceed the traction or adhesion between said wheel and the runway surface. As a result, the wheel 1 begins to slip and incidentally decelerate so rapidly relative to the rotary inertia mass in the control device 6, that the shaft 68 and the rocker arm 67 will be turned in a counter-clockwise direction, as viewed in the drawing. Lever 56 is thereby rocked from normal position about the pin 58 in a clockwise direction, as viewed in the drawing, against the opposing force of spring 61 to engage valve stem 53 and, in the manner heretofore described, to release fluid pressure in chamber 24 to atmosphere to permit valve member 17 to be opearted to its brake release position in which chamber 9 of the brake application device 3 will also be vented to atmosphere to release the braking effect on the wheel 1.

Upon release of the braking effect on wheel 1 in response to slipping thereof, in the manner described, said wheel will accelerate back to the ground speed of the airplane, while the inertia mass, which, during the time that said wheel was decelerating as a result of the slipping, was overrunning said wheel, will, during the time that said wheel is accelerating back to ground speed, momentarily lag behind so that the rocker arm 67, in returning to its normal position, in a clockwise direction, will momentarily move past its normal position until said inertia mass is brought up to synchronized speed with said wheel by the clutch means, then will return to its normal position. With the wheel 1 and the inertia mass of the control device 6 rotating in synchronization, said control device will effect operation of the piston valve device 15 to its normal position in which fluid pressure will be supplied to chamber 9 of the brake application device 3 to cause reapplication of braking effect on the wheel 1. If the wheel 1 again starts to slip before the vehicle is brought to a stop, the braking effect thereon will again be released and, upon cessation of wheel slip, reapplied in the same manner as above described, until eventually the vehicle comes to a stop, it being noted that actual locking and sliding of the wheel or wheels is positively prevented during stopping of the vehicle.

This automatic control of the brakes, however, may necessitate operation of the brake control apparatus through a series of braking and releasing cycles so frequently and rapidly that the fluid pressure in reservoir 2 is reduced too rapidly to permit the compressor (not shown) to maintain sufficient fluid pressure in said reservoir to insure effective operation of the brakes. To prevent such a possibility, the cutout valve device 7 and the valve locking device 16, in accordance with the invention, have been incorporated in the brake control apparatus.

Until the fluid pressure in reservoir 2 has been reduced to the minimum opearting value, the valve member 69 of the cutout device 7 will remain in its normal position and the fluid pressure in chambers 70 and 71 will be equalized through the passageway 73 connecting said chambers. Since the rib seat 76, in the normal position of valve member 69, will be seated on the gasket 77, the effective pressure area on the side of said valve member adjacent chamber 71 will be greater than the effective pressure area at the opposite side adjacent chamber 70. With valve member 69 in its normal position, chamber 38 of the valve locking device 16 will also be charged with fluid pressure from reservoir 2 through pipes 47 and 72 to maintain piston 36 in its normal position against the opposing force of spring 42.

Let it be assumed, however, that, through use, the drain on reservoir 2 has been such that the fluid pressure therein has been reduced to the minimum operating value. At that point, the force of spring 81 in the cut-out valve device 7, the compression of which has already been adjusted by screw 82, along with the force of pressure acting on the effective area on the side of valve member 69 adjacent chamber 70, will overcome the opposing force of fluid pressure acting on the opposite side of said valve member adjacent chamber 71 sufficiently to unseat the seat rib 76 from the gasket 77 thereby exposing the entire area of valve member 69 adjacent chamber 70 to the fluid pressure in said chamber 70 and causing said valve member 69 to move promptly to its cutoff position in which the sealing gasket 79 is seated against seat rib 80. In this manner further supply of fluid under pressure to chamber 38 of the locking device 16 through pipe 47, chamber 71 of cutout device 7 and pipe 72 is cut off, and chamber 38 is vented to atmosphere by way of pipe 72, chamber 71 of the cutout device 7, passageway 73, chamber 70 and vent 84. When the fluid pressure in chamber 38 of the locking device 16 has thus been vented to atmosphere, spring 42 will move piston 36 and piston rod 41 to its locking position to engage extending portion 33 of the valve member 17 and maintain said valve member in its normal position. In the manner just described automatic control of the braking and releasing effect of the wheel 1 is temporarily cut out, and the pilot may manually control said braking and releasing effect with the brake control valve device 5 until the pressure in reservoir 2 has been restored to the maximum value by the action of the compressor (not shown).

When the pressure in reservoir 2 has reached the maximum operating value, the fluid pressure acting on the surface of gasket 79 enclosed by seat rib 80 of the cutout device 7 will overcome the opposing force of spring 81 to unseat said gasket from said seat rib. Choke 74 in the passageway 73 will restrict passage of fluid pressure through said passageway to chamber 70 to permit valve member 69 to move rapidly, as by snap action, to its normal position and close off further venting of chamber 38 of the locking device 16 to atmosphere through vent 84, as above described. Chamber 38 of the locking device 16 will again be charged with fluid pressure, as previously described, to move piston 36 and piston rod 41 to their normal positions against the opposing force of spring 42. With the unlocking of valve member 17 of the piston valve device 15, braking and releasing effect of the wheel 1 will again be subject to automatic control by the control device 6, as hereinbefore described.

*Summary*

From the above description it will now be seen that I have provided for use with a fluid pressure operable brake apparatus of the type which automatically effects release and reapplication of braking effect on a wheel in response to slipping of said wheel to prevent locking or sliding of said wheel on a runway surface, automatic means for preventing depletion of fluid pressure available for brake application below a minimum operating value at which said fluid pressure would be insufficient for effective or safe brake application.

Having now described my invention, what I claim as new and desire to secure by Letters Patent, is:

1. A brake control apparatus comprising, in combination, a brake application device responsive to fluid pressure for effecting a brake application to a vehicle wheel and to relief of such pressure for releasing said brake application, a source of fluid under pressure, the pressure of which is adapted to be maintained within a certain operating range sufficient for effecting an effective and safe brake application to said wheel, conduit means providing for flow of fluid under pressure from said source to said brake application device, a piston valve device interposed in said conduit means and responsive to fluid pressure to operate to a normal position in which fluid under pressure may be supplied to said brake application device from said source and responsive to relief of such pressure to operate to a brake release position in which said brake application device is relieved of fluid pressure, a control device responsive to a slipping condition of said wheel for effecting release of fluid pressure from said piston valve device and responsive to cessation of said slipping condition for effecting restoration of fluid pressure to said piston valve device, a valve locking device associated with said piston valve device responsive to fluid pressure to operate to a normal inoperative position in which said piston valve device is free to operate and to relief of such pressure to operate to a locking position in which it engages said piston valve device to lock it in its normal position and thereby render it operatively unresponsive to said control device, and a cutout valve device interlocked with said source of fluid under pressure and said valve locking device, said cutout valve device being responsive to a reduction of fluid pressure at said source to a minimum operating value to operate to a cutoff position in which it relieves said valve locking device of fluid pressure and responsive to restoration of said fluid pressure at said source to a maximum operating value to operate to a normal position in which it causes fluid pressure to be supplied to said valve locking device.

2. A brake control apparatus comprising, in combination, a brake application device responsive to fluid pressure for effecting a brake application to a vehicle wheel and to relief of such pressure for releasing said brake application, a source of fluid under pressure, the pressure of which is adapted to be maintained within an operating range sufficient for effecting an effective and safe brake application to said wheel, a first conduit means connecting said brake application device to said source of fluid under pressure, manually operable valve means interposed in said first conduit means for controlling communication therethrough and selectively operable from a closed position in which said communication is closed to a brake application position in which said communication is open and fluid pressure supply from said source to said brake application device may be effected, a piston valve device interposed in said first conduit means between said brake application device and said manually operable valve means for automatically controlling communication through said first conduit means when said manually operable valve means is in a brake application position, said piston valve device also being responsive to fluid pressure from said source to operate to a normal position in which said communication through said first conduit means is open and responsive to relief of such pressure to operate to a brake release position in which said communication through said first conduit means is closed and said brake application device is relieved of fluid pressure independently of said manually operable valve means, a control device responsive to a slipping condition of said wheel to effect release of fluid pressure from said piston valve device and responsive to cessation of said slipping condition to effect restoration of fluid pressure to said piston valve device, a valve locking device associated with said piston valve device and being responsive to fluid pressure to operate to a normal inoperative position in which said piston valve device is free to operate and to relief of such pressure to operate to a locking position in which it engages said piston valve device to lock it in its normal position and thereby render it operatively unresponsive to said control device, a second conduit means connecting said valve locking device to said source of fluid under pressure, and a cutout valve device interposed in said second conduit means for controlling communication therethrough, said cutout valve device being responsive to pressure of fluid from said source at a minimum operating value to operate to a cutoff position in which communication through said second conduit means is closed and said locking device is relieved of fluid pressure and responsive to pressure of fluid from said source at a maximum operating value to operate to a normal position in which said communication through said second conduit means is open.

3. A brake control apparatus comprising, in combination, a brake application device responsive to fluid pressure for effecting a brake application to a vehicle wheel and to relief of such pressure for releasing said brake application, a source of fluid under pressure, the pressure of which is adapted to be maintained within an operating range sufficient for effecting an effective and safe brake application to said wheel, conduit means providing for flow of fluid under pressure from said source to said brake application device, manually operable valve means interposed in said conduit means for controlling the operation of said brake application device, said manually operable means being selectively operable to a brake application position from a closed position in which positions said brake cylinder device is supplied with and relieved of, respectively, fluid under pressure from said source, a piston valve device also interposed in said conduit means and operative independently of said manually operable means for controlling operation of said brake application device when said manually operable means is in a brake application position, said piston valve device having a normal position in which fluid pressure from said source is supplied to said brake application device and operable to a brake release position in which said brake application device is relieved of fluid pressure, a control device associated with said wheel and responsive to a slipping condition of said wheel for effecting operation of said piston valve device to its brake release position and responsive to cessation of said slipping condition for effecting operation of said piston valve device to its normal position, second conduit means, a locking device comprising a piston subject at one side to fluid pressure in a chamber connected by said second conduit means to said source of fluid under pressure and at the opposite side to biasing means, said piston being responsive to fluid pressure in said chamber to move said locking device to a normal inoperative position in which said piston valve device is free to operate and responsive to said biasing means, upon relief of said fluid pressure in said chamber, to move said locking device to a locking position in which it engages said piston valve device to lock it in its normal position, and a cutout valve device also interposed in said second conduit means for controlling communication therethrough between said source of fluid under pressure and said locking device, said cutoff valve device comprising a reciprocating valve member operable in resonse to a reduction of fluid pressure in said second conduit means to a minimum operating value to a cutoff position in which communication through said second conduit means is closed and said chamber is relieved of fluid pressure and operable in response to restoration of fluid pressure in said second conduit means to a maximum operating value to a normal position in which communication between said chamber and said source of fluid under pressure through said conduit means is open.

4. In combination with a fluid pressure operable brake control apparatus responsive to fluid pressure braking a vehicle wheel and to relief of such pressure for releasing said wheel, control means associated with said vehicle wheel and automatically responsive to a slipping condition of said wheel and to cessation of said slipping condition for operating said brake apparatus to release and effect a brake application on said wheel, respectively, a source of fluid under pressure, the pressure of which is adapted to be maintained within an operating range sufficient for effecting an effective and safe brake application to said wheel, conduit means, a locking device comprising a piston subject at one side to fluid pressure in a chamber which may be connected by said conduit means to said source of fluid under pressure and at the opposite side to biasing means, said piston being responsive to said biasing means, upon relief of fluid pressure in said chamber, to move said locking device to a locking position in which said control means is rendered ineffective and responsive to fluid pressure in said chamber to move to a normal position in which said automatic means is rendered effective, and a cutout valve device interposed in said conduit means comprising a reciprocating valve member operable in response to a reduction of fluid pressure at said source to a minimum operating value to a cutoff position in which communication through said conduit means is closed and said chamber is relieved of fluid pressure and operable in response to restoration of fluid pressure at said source to a maximum operating value to a normal position in which communication between said chamber and said source of fluid under pressure through said conduit means is open.

5. In a brake control apparatus, the combination comprising a source of fluid under pressure, fluid pressure operable brake means responsive to fluid pressure for effecting a brake application and to relief of such pressure for effecting release of said brake application on a vehicle wheel, conduit means providing for flow of fluid under pressure from said source to said brake means, valve means interposed in said conduit means having a normal position in which fluid under pressure may be supplied from said source to said brake means and a release position in which fluid presure is released from said brake means, a control device responsive to a slipping of said wheel for effecting application of an actuating force on said valve means for operating said valve means to its said release position and responsive to cessation of said slipping for effecting operation of said valve means to its normal position, a locking device responsive to fluid pressure to move to a normal position in which said valve means is free to operate and operative upon relief of such pressure to a locking position in which it causes a force in opposition to said actuating force to be exerted on said valve means whereby said valve means is maintained in its said normal position, and valve means responsive to the pressure of fluid at said source at a chosen high value for effecting supply of fluid pressure to said locking device and responsive to pressure of fluid at said source below a chosen low value for effecting relief of fluid pressure from said locking device.

6. In a brake control apparatus, the combination comprising a source of fluid under pressure, fluid pressure operable brake means responsive to fluid pressure for effecting a brake application and to relief of such pressure for effecting release of said brake application on a vehicle wheel, conduit means providing for flow of fluid under pressure from said source to said brake means, valve means interposed in said conduit means having a normal position in which fluid under pressure may be supplied from said source to said brake means and a release position in which fluid pressure is released from said brake means, a control device responsive to a slipping of said wheel for effecting application of an actuating force on said valve means for operating said valve means to its said release position and responsive to cessation of said slipping for effecting operation of said valve means to its normal position, fluid pressure operative locking means having a normal position in which it permits the free operation of said valve means and a locking position in which it prevents operation of said valve means, and valve means responsive to the pressure of fluid at said source at a chosen high value for controlling the fluid pressure acting on said locking means so as to cause said locking means to be operated to its said normal position and responsive to pressure of fluid at said source below a chosen value for controlling the fluid pressure acting on said locking means so as to cause said locking means to be operated to its said locking position.

7. In a brake control apparatus, in combination, fluid pressure operable brake means associated with a vehicle wheel, a source of fluid under pressure, conduit means providing for flow of fluid under pressure from said source to said brake means, manually operable valve means interposed in said conduit means for effecting supply of fluid under pressure from said source to and release of fluid pressure from said brake means for effecting brake application and release of brake application, respectively, on said wheel, means automatically operative in response to a slipping of said wheel while a brake application is in effect for effecting release of fluid pressure from said brake means and subsequent restoration of fluid pressure thereto upon cessation of said slipping, independently of said manually operable means, and means subject at all times to the pressure of fluid at said source and operative in response to a reduction of the pressure of fluid at said source below a chosen degree to prevent said automatically operative means from effecting release of fluid pressure from said brake means.

References Cited in the file of this patent

UNITED STATES PATENTS

| | | |
|---|---|---|
| 2,053,461 | Campbell | Sept. 8, 1936 |
| 2,088,169 | Hewitt | July 27, 1937 |
| 2,109,168 | Miller | Feb. 22, 1938 |
| 2,198,029 | Farmer | Apr. 23, 1940 |
| 2,232,883 | Neveu | Feb. 25, 1941 |